Oct. 2, 1923.
W. BAUERSFELD
1,469,474
COMPENSATING DEVICE FOR CINEMATOGRAPHS
Filed June 14, 1922
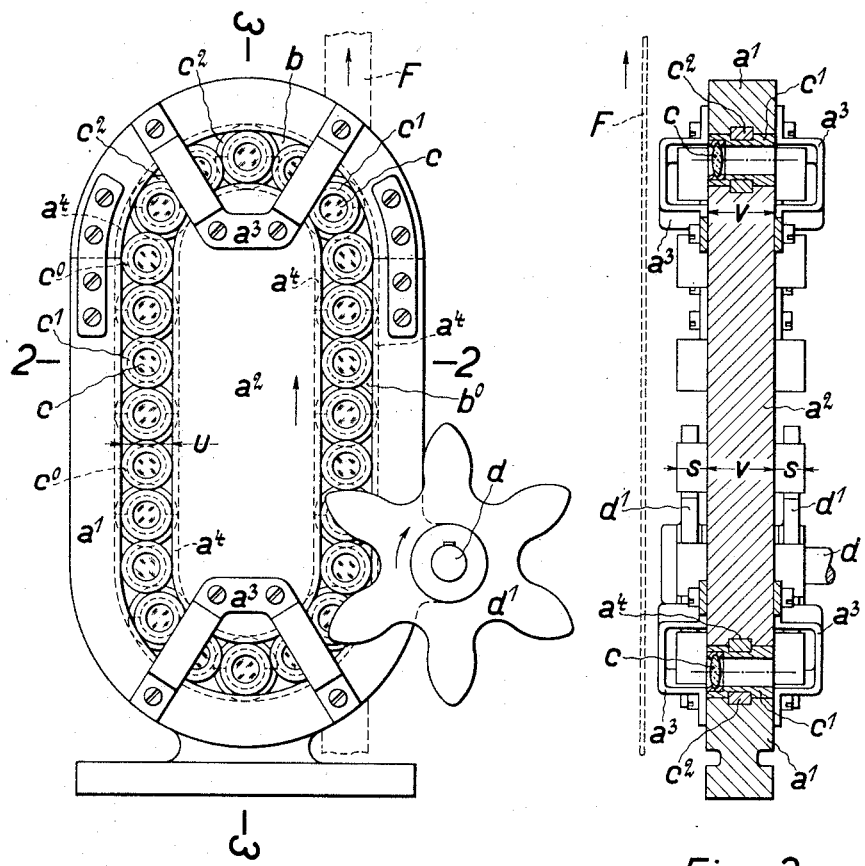
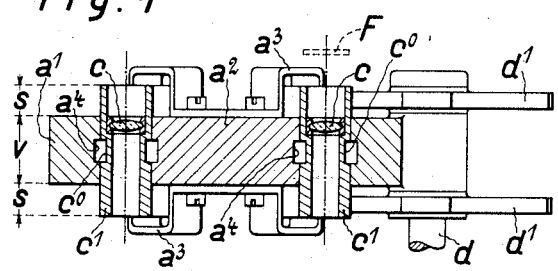
Fig. 1
Fig. 3
Fig. 2
Inventor:
Walter Bauersfeld Patented Oct. 2, 1923.

1,469,474

UNITED STATES PATENT OFFICE.

WALTHER BAUERSFELD, OF JENA, GERMANY, ASSIGNOR TO THE FIRM OF CARL ZEISS, OF JENA, GERMANY.

COMPENSATING DEVICE FOR CINEMATOGRAPHS.

Application filed June 14, 1922. Serial No. 568,297.

*To all whom it may concern:*

Be it known that I, WALTHER BAUERSFELD, a citizen of the German Empire, and residing at Jena, Germany, have invented a new and useful Compensating Device for Cinematographs (for which I have filed an application in Germany June 27, 1921), of which the following is a specification.

The present invention relates to a compensating device for cinematographs containing an endless series of lenses, which afford optical compensation of the travelling of the image and are movably disposed in a plane perpendicular to their optical axes in a slit, having a rectilinear part, and which are further disposed in such a manner that their mounts, on traversing the rectilinear part of the slit, come in contact with each other. In contrast to the series of lenses of such kind as shown, e. g. in Fig. V of the English patent specification 16202 of the year 1915, according to the invention the lenses are joined in the slit in series without any connexion whatever, whilst for actuating the lenses there serves a system of wheels (which may consist of a single wheel) and which wheels engage in the lens mounts. Apart from the simplicity of the new structure, in the present case by making the diameters of the lens mounts exactly agree with each other, by exactly centering the lenses in their mounts as well as by exactly making the plane surfaces of the rectilinear part of the slit it is possible to fulfil in a particularly high degree the condition that the optical axes of the lenses during their passage through the field or rays of the cinematograph move in a plane in such a manner that they remain exactly equidistant from each other. If an arrangement has been made by which the lenses in the rectilinear part of the slit are elastically pressed against the one slit surface, it is substantially only of importance that this one slit surface is exactly plane.

In order that the motion of the lenses in the slit may take place as noiselessly as possible, it is advisable to select the number of lenses in such a manner that the slit is filled with lenses for its full length. A favorable gearing may be attained if of the wheel system serving for the actuation each wheel only coacts with every second lens mount. With a view to impart to the lenses, on traversing the rectilinear part of the slit, a uniform motion, the wheel system actuating the lenses is suitably so devised that there only coact with the wheel system the lens mounts lying in the rectilinear part of the slit at any one time. With a view to impart to the lenses a guide by which they are prevented from laterally slipping out of the slit and simultaneously from becoming askew, every second lens mount is provided with a neck ring which engages on the one hand in corresponding grooves of the adjoining mounts and on the other hand in a groove in the one slit-wall surrounding the entire slit.

The annexed drawing shows a constructional example of the invention; Fig. 1 shows an elevation, whilst Figs. 2 and 3 are sections on the lines 2—2 and 3—3 of Fig. 1.

Two plate-shaped bodies $a^1$ and $a^2$ are by means of bands $a^3$ rigidly connected in such a way that between them there is formed a slit $b$ which is close in itself and which contains a rectilinear part $b^0$, whilst as for the rest its shape is immaterial. In the slit $b$ there are loosely joined in series 24 lenses $c$, all mounts $c^1$ of which have a diameter equal to the width $u$ of the slit. The lengths of the mounts differ from one another, viz, the one half of the mounts has a length equal to the depth $v$ of the slit $b$ and is disposed in the latter in such a way that both ends of the mounts terminate with the slit, whilst the other half of the mounts has a length $v+2s$ and is disposed in the slit in such a way that the mounts project on either side of the slit by the amount $s$. Short and long mounts appear alternately. With a view to protect the mounts from lateral displacements relative to the slit and from becoming askew, every second mount is provided with a neck ring $c^2$ engaging in corresponding annular grooves $c^0$ of the adjoining mounts. All neck rings $c^2$ are guided in a groove $a^4$ of each slit-wall, surrounding the entire slit. The lenses are moved in the slit $b$ in the arrow-direction by two toothed wheels $d^1$, disposed on a common shaft $d$ and coacting with the long mounts. The shaft $d$ is rotatable in the arrow-direction and supported on the body $a^1$ in such a manner that the toothed wheels $d^1$ are only coacting with those mounts which lie at any one time in the rectilinear part $b^0$ of the slit $b$. The above described device is assumed to be fitted to a cinematograph, affording optical compensation of the travelling of the image, in such a way that the rectilinear part $b^o$ of the slit faces the film F, i. e., that the direction of motion of the lenses in this part $b^o$ of the slit agrees with the direction of motion of the film.

I claim:

1. In a compensating device for cinematographs an endless series of lenses affording optical compensation of the travelling of the image, the said lenses being movable in a plane perpendicular to their optical axes, a body having a slit, a part of the said slit being rectilinear, the said lenses being without relative connexion and their mounts, on traversing the said rectilinear part, being contiguous to each other, and a system of wheels actuating the lenses and engaging in the lens mounts.

2. In a compensating device for cinematographs an endless series of lenses affording optical compensation of the travelling of the image, the said lenses being movable in a plane perpendicular to their optical axes, a body having a slit, a part of the said slit being rectilinear and being filled up with lenses for its full length, the said lenses being without relative connexion and their mounts, on traversing the said rectilinear part, being contiguous to each other, and a system of wheels actuating the lenses and engaging in the lens mounts.

3. In a compensating device for cinematographs an endless series of lenses affording optical compensation of the travelling of the image, the said lenses being movable in a plane perpendicular to their optical axes, a body having a slit, a part of the said slit being rectilinear, the said lenses being without relative connexion and their mounts, on traversing the said rectilinear part, being contiguous to each other, and a system of wheels actuating the lenses and each of the said wheels only co-acting with every second lens mount.

4. In a compensating device for cinematographs an endless series of lenses affording optical compensation of the travelling of the image, the said lenses being movable in a plane perpendicular to their optical axes, a body having a slit, a part of the said slit being rectilinear, the said lenses being without relative connexion and their mounts, on traversing the said rectilinear part, being contiguous to each other, and a system of wheels actuating the lenses and only the lens mounts, lying in the said rectilinear part at any one time, coacting with the said wheel system actuating the lenses.

5. In a compensating device for cinematographs an endless series of lenses affording optical compensation of the travelling of the image, the said lenses being movable in a plane perpendicular to their optical axes, a body having a slit, a part of the said slit being rectilinear, the said lenses being without relative connexion and their mounts, on traversing the said rectilinear part, being contiguous to each other, every second lens mount being provided with a neck ring which engages on the one hand in corresponding grooves of the adjoining lens mounts and on the other hand in a groove in the one slit-wall, surrounding the entire slit, and a system of wheels actuating the lenses and engaging in the lens mounts.

WALTHER BAUERSFELD.

Witnesses:
PAUL KRÜGER,
FRITZ SANDER.